United States Patent

[11] 3,555,274

| [72] | Inventors | Leonard Baurmash<br>Canoga Park;<br>Burton T. Harwick, Northridge; Jack T.<br>Meyer, Santa Susana, Calif. |
|---|---|---|
| [21] | Appl. No. | 633,966 |
| [22] | Filed | Apr. 26, 1967 |
| [45] | Patented | Jan. 12, 1971 |
| [73] | Assignee | North American Rockwell Corporation<br>a corporation of Delaware |

[54] RADIATION MEASUREMENT INSTRUMENT USING SCATTER RADIATION
4 Claims, 4 Drawing Figs.

[52] U.S. Cl. ................................................ 250/43.5
[51] Int. Cl. ................................................ G01n 23/12
[50] Field of Search ................................ 250/43.5D, FL, R

[56] References Cited
UNITED STATES PATENTS

| 2,316,239 | 4/1943 | Hare | 250/43.5D |
| 2,323,128 | 6/1943 | Hare | 250/43.5FL |
| 2,873,377 | 2/1959 | McKay | 250/43.5D |
| 3,244,897 | 4/1966 | Schafer | 250/43.5FL |
| 3,344,273 | 9/1967 | Ziegler | 250/43.5D |

*Primary Examiner*—Archie R. Borchelt
*Attorneys*—L. Lee Humphries, H. Fredrick Hamann, Thomas S. MacDonald and Robert M. Davidson ABSTRACT: A radiation measurement instrument for measuring a quantity or mass of material where the instrument has at least a radiation source and radiation detector suitably positioned in the material.

PATENTED JAN 12 1971

3,555,274

INVENTORS.
LEONARD BAURMASH
BURTON T. HARWICK
BY JACK T. MEYER

Donald J. Ellingsberg

RADIATION MEASUREMENT INSTRUMENT USING SCATTER RADIATION

BACKGROUND OF THE INVENTION

The invention relates to an improved radiation measurement instrument, and more particularly to a radiation measurement instrument using scatter radiation for the measurement of a quantity or mass of material.

Known radiation measurement instruments use the attenuation of radiation emanating from radiation sources by the atoms of a material through which the radiation passes. One or more radiation sources and a detector are associated with the material so that radiation passes through the material to the detector. The greater the quantity, the greater the attenuation of radiation as it passes through the material and the smaller the total signal generated in the detector of the instrument. The phenomenon of scattering of radiation from an external radiation source upon passage through a quantity or mass of material to an external radiation detector is also known. Scattering is a function of the quantity or mass of the material and is not influenced by its chemical state or physical form. However, known radiation measurement systems using either attenuated or scatter radiation to determine the quantity or mass of material have been limited to relatively small amounts of material, and have not been suitable for relatively large amounts of material such as would be found in a storage tank, ship hold, or the like.

OBJECTS OF THE INVENTION

Accordingly, it is an object of the invention to provide an improved radiation measurement instrument using scatter radiation for the measurement of a quantity or mass of material.

Another object of the invention is to provide a radiation measurement instrument for the measurement of a large quantity or mass of material.

A further object of the invention is to provide a radiation measurement instrument that utilizes lower radiation source strengths and has more favorable radiation source-to-detector geometry.

It is also an object of the invention to provide a radiation measurement instrument wherein the ratio of count rate signal level between a large quantity or mass of material and a small quantity or mass of material is substantially increased.

Still a further object of the invention is to provide a radiation measurement instrument that minimizes statistical error as the quantity or mass of material is reduced.

SUMMARY OF THE INVENTION

Briefly, in accordance with the invention, a radiation measurement instrument for the measurement of a quantity or mass of material is provided having a radiation source means positioned substantially in the material. The radiation source emits random-in-time primary radiation which interacts with the material and develops secondary radiation that is detected by a radiation detector means positioned substantially in the material. The radiation detector is responsive to at least the secondary radiation and generates a corresponding count rate signal that is a function of the total quantity or mass of material. The count rate signal is fed to an indicator means where it is processed and displayed as the total measured quantity or mass of material. A suitable radiation shield means is positioned in the material generally between the source and the detector so that the detector is primarily responsive to the secondary radiation.

Further objects, features, and the attending advantages of the invention will be apparent when the following description is read in connection with the accompanying drawing.

DESCRIPTION OF THE INVENTION

Figure 1:
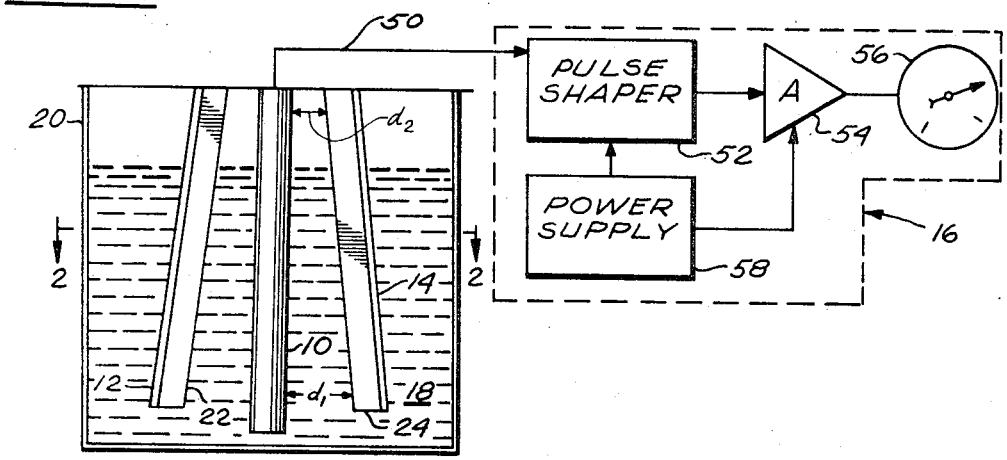
FIG. 1 is a schematic elevation, partly broken away, and block diagram of one form of the radiation measurement instrument of the invention.

Referring to FIG. 1, one form of radiation measurement system is shown having a detector means such as radiation detector 10, radiation source means such as radiation sources 12 and 14, and an indicator means such as indicator unit 16. The radiation detector 10 and the radiation sources 12 and 14 are generally positioned in a quantity or mass of material such as fluid 18 that is contained, in the form of radiation measurement instrument shown, within container or tank 20. Radiation shield means such as radiation shields 22 and 24 are generally interposed between sources 12 and 14, respectively, and the detector 10.

Figure 2:
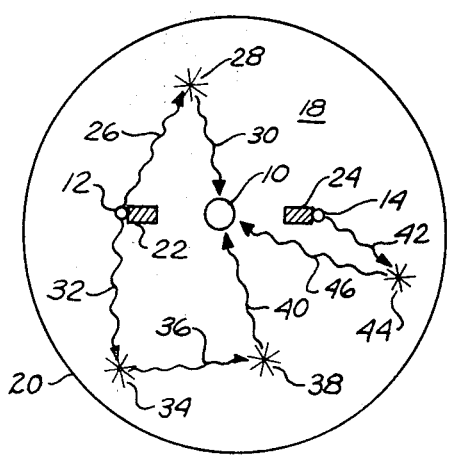
FIG. 2 is a sectional view of a portion of the radiation measurement instrument of FIG. 1 along the line 2–2.

Referring to FIG. 2, the radiation shields 22 and 24 are suitably positioned substantially between the radiation sources 12 and 14, respectively, and the detector 10 so that primary radiation emanating from each of the radiation sources 12 and 14 in the general direction of the detector 10 can not reach the detector, while primary radiation emanating away from the radiation shields 22 and 24 passes into the volume defined by the container 20. When a quantity or mass of material such as fluid 18 is contained within the container 20, the random radiation emanating from the radiation sources 12 and 14 passes into the fluid 18. For example, when the radiation sources 12 and 14 are gamma emitters, a gamma photon emitted from radiation source 12 passes into the fluid 18 along radiation path 26. The gamma photon continues along radiation path 26 until an interaction occurs between the gamma photon and an atom of the fluid 18. This interaction is illustrated by FIG. 2 as a first scatter incident 28. The resulting secondary or scatter radiation from the scatter incident 28 travels along a first scatter radiation path 30 to the radiation detector 10. Similarly, a gamma photon emitted from radiation source 12 passes along a radiation path 32 into the fluid 18 where the gamma photon interacts with an atom of the fluid in a first scatter incident 34. The resulting scatter radiation travels from the first scatter incident 34 along a first scatter radiation path 36 until the scatter radiation interacts with another atom of the fluid 18 at a second scatter radiation incident 38. The scatter radiation resulting from the second scatter incident 38 travels along a second scatter radiation path 40 to the radiation detector 10. Likewise, a gamma photom emitted from radiation source 14 travels along a radiation path 42 into the fluid 18 until it interacts with an atom of fluid at first scatter incident 44. The scatter radiation travels from the scatter incident 44 along a first scatter radiation path 46 to the radiation detector 10. All the radiation emanating from radiation sources 12 and 14, and all the scatter incidents and resulting secondary or scatter radiation paths are not shown by FIG. 2 for purposes of clarity. However, it is to be understood that there are multiple emanations from the radiation sources as well as respectively, scatter incidents and resulting secondary or scatter radiation paths.

Referring again to FIG. 1, the secondary or scatter radiation as described and shown by FIG. 2 that reaches radiation detector 10 is converted by the radiation detector 10 into corresponding electrical output pulses that are fed to the indicator unit 16 through lead 50. The input pulses from lead 50 are shaped to a uniform height and width in a conventional pulse shaper 52. The shaped pulses are fed to a conventional integrating amplifier 54 that sums the input pulses and feeds a readout signal to a readout means or indicating device such as readout indicator 56. The readout signal generated by the integrating amplifier 54 is a voltage signal that electrically represents the average number of input pulses fed to the pulse shaper 52 from the radiation detector 10 for a predetermined unit of time. The indicator unit 16 includes a conventional power supply 58 that feeds power to the pulse shaper 52 and the radiation detector 10, and to the integrating amplifier 54; all in a conventional manner. It is contemplated that a standard bias voltage input to amplifier 54 can be used to calibrate indicator 56 for a zero-scale reading when the container is empty.

Operatively, the radiation measurement system as shown by FIGS. 1 and 2 generates a readout signal that represents the quantity or mass of material such as fluid 18 in the container or tank 20. When the container 20 is empty, a small number of scatter radiations occur because the radiation emanating from the radiation sources 12 and 14 interact with atoms of the material that forms the wall of the container and become scatter radiation. These scatter radiation are counted; however, the indicator unit 16 compensates for the resulting small readout signal so that readout indicator 56 shows a zero scale reading representing the absence of fluid 18 in the container 20. When an increment of fluid 18 is added into the container 20, there is a proportional increase in scatter radiation from the more frequent encounters by the gamma photons with the atoms of the fluid. A portion of this scatter radiation is deflected or scattered toward the detector 10 as is particularly described and shown by FIG. 2. The scatter radiation received by detector 10 is directly proportional to the incremental increase in the quantity of fluid 18 in the container 20. The total scatter radiation is a function of the total quantity of fluid 18 that is present around the radiation sources 12 and 14. A void, such as a bubble in the fluid 18, reduces the total scatter radiation density within container 20 by an amount that is proportional to the bubble volume. Therefore, the bubble geometry does not substantially affect the accuracy of the radiation measurement system of the invention.

Figure 3:
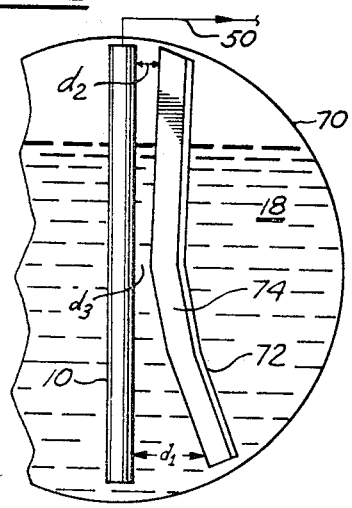
FIG. 3 is a sectional elevation, partly broken away, of another form of the radiation measurement instrument of the invention.

Referring to FIG. 3, another form of radiation measurement system is shown where like parts as previously described and shown by FIGS. 1 and 2 are identified by the same reference numerals in FIG. 3. Radiation detector 10 is positioned in a quantity of fluid 18 contained within a spherical volume that is defined by a spherical container 70. A radiation source 72 is positioned within the container 70 in the fluid 18. A radiation shield 74 is positioned substantially between the radiation detector 10 and the radiation source 72 so that primary radiation emanating from the radiation source in the general direction of the detector can not reach the detector, as has been previously described and shown by FIGS. 1 and 2. Radiation emanating from the radiation source 72 into the spherical volume defined by the container 70 encounters atoms of the fluid 18 and scatters toward the detector 10. Electrical pulses that correspond to the scatter radiation received by the detector 10 are fed through lead 50 to an indicator unit (not shown), such as indicator unit 16 as shown by FIG. 1.

Referring now to FIGS. 1 and 3, the radiation measurement instrument as described and shown by FIG. 1 is operatively positioned in a quantity or mass of material contained in a container 20 that has a generally right-cylindrical geometry. The radiation measurement system as described and shown by FIG. 3 is operatively positioned within a container 70 that has a spherical geometry. The different geometries of the containers 20 and 70 require different spacing arrangements between the radiation detector and the radiation sources for maximum gaging accuracy. For the right-cylindrical container 20 of FIG. 1, the distance $d_1$ between the radiation source 14, for example, and the radiation detector 10 is preferably greater than the distance $d_2$. The distances $d_1$ and $d_2$ can be selectively determined so that the change in detector counting rate per unit change in material, e.g., fluid 18, can be held substantially constant. For the spherical container 70 of FIG. 3, the distance $d_1$ between the radiation source 72 and the radiation detector 10 is greater than the distance $d_2$ which is greater that the distance $d_3$ between the radiation source and the radiation detector. This preferred spacing, i.e., $d_1 > d_2 > d_3$, between the radiation source 72 and the radiation detector 10 yields a unit increase in detector counting rate per unit increase in material, e.g., fluid 18, in container 70. It can therefore be seen that for each geometry of the quantity or mass of material that is measured by the radiation measurement system of the invention, the accuracy of the system can be sharply increased by the selective positioning of the radiation source in spaced relationship to the radiation detector. While a parallel relationship between the radiation source and the radiation detector will yield satisfactory results, the radiation measurement system of the invention is preferably utilized with the differential spacing between the radiation source and the radiation detector, for example, such as have been described and shown for the right-cylindrical geometry of container 20 as shown by FIG. 1, and the spherical geometry of container 70 as shown by FIG. 3, or for any quantity or mass of material not contained within a container or tank.

Figure 4:
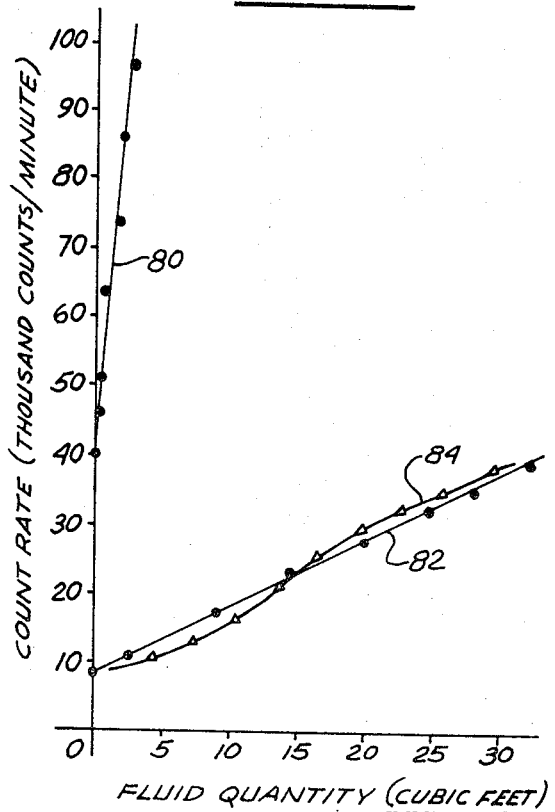
FIG. 4 is a graphical representation of measurement curves developed by the radiation instruments of FIGS. 1 and 3.

FIG. 4 shows sample measurements obtained by the radiation measurement system of the invention for each of the container geometries as shown by FIGS. 1 and 3. Curve 80 of FIG. 4 represents the detector count rate when the radiation measurement system of the invention measured the quantity of fluid in a container having right-cylindrical geometry, such as container 20 of FIG. 1. The count rate as shown by curve 80 was approximately 40,000 counts per minute when the container 20 was empty of fluid and increased generally in a direct proportion to approximately 110,000 counts per minute when the container was completely filled with fluid; approximately 3 cubic feet. The distance $d_1$ and $d_2$ between the radiation source and the radiation detector were: $d_1 = 5$ inches; $d_2 = 3\frac{1}{2}$ inches. Curve 82 of FIG. 4 represents the detector count rate when the radiation measurement system of the invention was used with a spherical container, such as container 70 of FIG. 3. The count rate as shown by curve 82, with the container attitude at 0°, was approximately 10,000 counts per minute when the container 70 was empty of fluid and increased linearly to approximately 38,000 counter per minute when the fluid quantity was approximately 33 cubic feet. The distances $d_1$, $d_2$, and $d_3$ between the radiation source and the radiation detector were: $d_1 = 7\frac{1}{2}$ inches; $d_2 = 4\frac{1}{2}$ inches; $d_3 = 3\frac{1}{2}$ inches. Curve 84 of FIG. 4 represents the detector count rate when the container is tilted at an attitude of 30°. Curve 84 represents about a 4 percent error when compared to the 0° calibration curve 82. In developing curves 80, 82, and 84 of FIG. 4, a conventional Geiger-Mueller tube was used as the radiation detector in the radiation measurement system of the invention, the radiation source was $Ky^{85}$ (for cryogenic fluids a source such as $Cs^{137}$ would be selected), the radiation shields were rectangular strips of lead, and the readout indicator utilized standard electronic components and circuitry.

Container geometries other than the geometries of containers 20 and 70 as described and shown by FIGS. 1 and 3, respectively, will require a modified source-detector geometry to achieve linear count rate signals, such as shown by curves 80 and 82 of FIG. 4. Likewise, a different curve function other than the curves 80, 82, and 84 as shown by FIG. 4 will require a different source-detector geometry.

As will be evidenced from the foregoing description, certain aspects of the invention are not limited to the particular details of construction as illustrated and it is contemplated that other modifications and applications will occur to those skilled in the art. It is also contemplated that the radiation sources can be positioned about the radiation detector in other physical arrangements than as have been described and shown; for example, the radiation sources may be positioned about the radiation detector in a cruciform, in a triangular configuration, in a generally circular configuration, or the like. Therefore, it is intended that the appended claims shall cover such modifications and applications that do not depart from the true spirit and scope of the invention.

We claim:

1. An improved radiation measurement instrument for measuring a quantity or mass of material comprising:
   a. radiation means having a first and a second end generally positioned in the quantity of material and emanating primary radiation so that at least a portion of said primary radiation passes into the material and at least a portion thereof interacts with the material thereby developing a secondary radiation;

b. detector means having a first end and a second end and is generally positioned in the quantity of material in a spaced-apart relationship with said radiation means so that said detector means first and second ends cooperate with said radiation means first and second ends, respectively said detector means responsive to said secondary radiation;

c. shield means positioned substantially between said radiation means and said detector means, said shield means absorbing at least a portion of said primary radiation; and d. measuring means coupled to said detector means so that the quantity or mass of material is determined by the total secondary radiation per unit time reaching said detector means.

2. The radiation measurement instrument of claim 1 in which said spaced-apart relationship is substantially parallel.

3. The radiation measurement instrument of claim 1 in which said spaced-apart relationship is substantially differential.

4. The radiation measurement instrument of claim 3 in which said substantially differential spaced-apart relationship comprises said respective first ends of said radiation means and said detector means spaced apart by a distance $d_1$, and said respective second ends spaced apart by a distance $d_2$ where distance $d_1$ distance $d_2$.

UNITED STATES PATENT AND TRADEMARK OFFICE
CERTIFICATE OF CORRECTION

PATENT NO. : 3,555,274

DATED : January 12, 1971

INVENTOR(S) : Leonard Baurmash et al

It is certified that error appears in the above-identified patent and that said Letters Patent are hereby corrected as shown below:

Column 2, line 52, "photom" should read --photon--; line 61, delete "respectively," and insert --multiple--.

Column 4, line 28, "distance" should read --distances-- line 36, "counter" should read --counts--; line 39, "3½" should read --3⅛--; line 46, "$Ky^{85}$" should read --$Kr^{85}$--.

Column 6, line 14, after "$d_1$" insert -->--.

Signed and Sealed this

Tenth Day of August 197

[SEAL]

Attest:

RUTH C. MASON
*Attesting Officer*

C. MARSHALL DANN
*Commissioner of Patents and Trademarks*